Patented May 12, 1953

2,638,459

UNITED STATES PATENT OFFICE 2,638,459

METHOD OF PREPARING PETROLEUM WAX COMPOSITIONS CONTAINING A SMALL AMOUNT OF A POLYETHYLENE

John R. Bowman and William P. Ridenour, Pittsburgh, Pa., and June Hollenback Whittaker, Lombard, Ill., assignors to Gulf Research & Development Company, Pittsburgh, Pa., a corporation of Delaware No Drawing. Application December 4, 1950, Serial No. 199,154

9 Claims. (Cl. 260—28.5)

This invention relates to improved petroleum wax compositions, and more particularly it relates to stable homogeneous high tensile strength paraffin wax compositions containing high molecular weight ethylene polymers and the method of preparing such wax compositions.

This application is a continuation-in-part of our prior copending application Serial No. 601,556, filed June 25, 1945, and assigned to the same assignee as the instant application.

In many of the applications of paraffin wax in industry, improved tensile strength is a desirable factor. For example, in the case of so-called paper milk bottles, which are paper bottles coated with paraffin wax, the tensile strength of the wax is particularly important because of the strain to which the bottle is subjected in handling.

In any composition of paraffin wax designed to increase tensile strength other inherently desirable features of the paraffin wax should not be reduced.

It should, for example, not block (tendency for a pile or roll of waxed paper to adhere together). Mottling (a disfiguration caused by entrained air) and a tendency toward scuffing found particularly in paraffin wax are undesirable and it is desired to reduce such tendencies.

The use of high molecular weight ethylene polymers in admixture with paraffin waxes, particularly for the coating or waxing of paper and the like has not been practical because the high molecular weight solid ethylene polymers dissolve with difficulty in molten paraffin wax even at temperatures at 150° F.–160° F., normally used for waxing machine operations. While the solid ethylene polymers in melted condition are miscible with paraffins in all proportions, they tend to crystallize from solution at temperatures below about 230° F.

It is therefore an object of this invention to produce a petroleum wax composition of increased tensile strength.

It is a further object of this invention to produce a paraffin wax composition of increased tensile strength without decreasing other desirable features of paraffin wax.

It is a further object of this invention to produce a composition of paraffin wax of increased tensile strength with decreased mottling and scuffing characteristics.

It is also an object of the present invention to provide stable homogeneous wax compositions containing high molecular weight ethylene polymers. Another object of the invention is to provide a high tensile strength, stable, homogeneous paraffin wax composition containing high molecular weight ethylene polymers suitable for waxing paper.

Another object of the invention is to provide a method of rapidly bringing a high molecular weight ethylene polymer in solution in a petroleum wax.

Other objects and advantages of the invention will become apparent from the following description thereof.

We have discovered that petroleum wax compositions containing high molecular weight ethylene polymers, which possess high tensile strength properties and which remain homogenous, can be obtained by incorporating in the wax small but sufficient amounts of solid ethylene polymers to substantially increase the tensile strength of the wax but insufficient to have a substantial effect upon other desirable properties of the wax. For example, we have found that these properties can be attained by incorporating in the wax from about 0.001% to about 0.2% (by weight) of ethylene polymers having average molecular weights of from about 5,000 to about 25,000, and preferably from about 10,000 to about 20,000. For certain uses where a slight haze or cloud is not objectionable, we can use up to 1.0%, or even up to 7%, of the ethylene polymer. In its broader aspects, then, our invention contemplates a petroleum wax composition containing an amount of solid polymerized ethylene sufficient to increase tensile strength but not substantially to change other desirable characteristics of the petroleum wax, and usually from about 0.001 to about 7 per cent of the total composition. Good results are obtained with from about 0.1 to about 0.5 per cent of solid polymerized ethylene.

The high molecular weight solid ethylene polymers can be obtained by subjecting ethylene to pressures above 500 atmospheres and temperatures above about 100° C. The high pressure and temperature method of preparing high molecular weight ethylene polymers is described in detail in U. S. 2,153,553 issued to E. W. Fawcett et al. April 11, 1939. Another method of preparing high molecular weight ethylene polymers is described in U. S. 2,188,465 issued to M. W. Perrin et al. January 30, 1940. The polymerized ethylene can have a molecular weight as high as 80,000 or more. One type which has been found highly desirable is known as "Polythene" and has an average molecular weight in the range of 18,000 to 20,000, a specific gravity of 0.92 and a softening temperature (transparency point) of 105° C.

The petroleum wax used can be a crystalline or paraffin wax or a microcrystalline or amorphous wax such as a petrolatum wax having melting points of from about 140° F. to about 180° F. and preferably from about 145° F. to about 165° F. The petroleum waxes best adapted for use in the present invention are the crystalline or paraffin waxes having melting points of from about 120° F. to about 140° F., and preferably from about 130° F. to about 135° F.; such waxes are used for the coating or waxing of paper. Preferably the wax should not have an oil content greater than 0.5 per cent.

The high molecular weight ethylene polymers are dissolved with difficulty in molten petroleum waxes. However, the solution of such polymers in molten waxes can be greatly facilitated and accelerated by first forming a blend of the polymer containing from about 5% to about 60% of the wax, preferably by milling at a temperature of from about 220° F. to about 360° F., and then dissolving the polymer-wax blend in the wax at a temperature of about 140° F. to about 250° F. The blend of ethylene polymer and wax can be prepared by stabilizing the ethylene polymer with a small amount of a stabilizer or anti-oxidant and milling the paraffin wax into the polymer at about 270° F. Although the milled blend becomes opaque on cooling the mixture remains very intimate or homogeneous.

The following examples are illustrative of the present invention.

*Example 1.*—In order to dissolve polymerized ethylene in paraffin wax, an ethylene polymer having an average molecular weight of about 18,000 to 20,000 was mixed with an equal weight of a 132° F. (ASTM) melting point paraffin wax and the mixture was maintained at 329° F. until it became fluid enough to flow freely. The blend was then poured into successive portions of molten paraffin wax (132° F. melting point) in amounts sufficient to result in the final paraffin wax-ethylene polymer compositions containing 0.25, 0.5, 1, 2, 3 and 5% by weight of ethylene polymer, respectively. The blend readily dissolved in the molten wax, the temperature of the mixtures being maintained at 212° F. to insure homogeneity. Upon cooling to the solid state, the final compositions were homogeneous and were not mottled. Small percentages of the polymerized ethylene gave large increases in tensile strength.

The tensile strengths of the blends and of the uncompounded wax were determined by the Perkins test, described in Bureau of Mines Bulletin No. 388, by R. H. Espach. Five test briquettes were prepared for each blend by pouring the blends into the briquette molds at 100°–110° C. and then aging them at 70° F. for 20 hours. The rate of pull on the test machine was 12 inches per minute. The tensile strength was measured in pounds per ¼ square inch and was determined for each blend and the uncompounded wax by averaging the tensile strengths found for the five individual test briquettes of each composition. The tensile strengths are shown in Table I.

TABLE I

| Concentration of Polymerized Ethylene, Percent | 0 | 0.25 | 0.5 | 1.0 | 2.0 | 3.0 | 5.0 |
|---|---|---|---|---|---|---|---|
| Average Tensile Strength, Lbs./¼ sq. in. | 95.97 | 127.6 | 135.58 | 143.41 | 144.32 | 149.27 | 157.3 |

*Example 2.*—Equal quantities of paraffin wax having a melting point of 132° F. (ASTM) and polymerized ethylene were warmed under conditions avoiding superheating to a temperature of about 329° F. with stirring. This treatment was continued for about an hour and the product was then mixed with a further quantity of the same paraffin wax in a molten state such that the total composition contained 0.5% polymerized ethylene. The final product was determined to have a tensile strength of 133 pounds by the Perkins test as compared with 93 pounds for the paraffin wax alone.

*Example 3.*—Polymerized ethylene was blended with a 132° F. melting point paraffin wax and a 122° F. melting point paraffin wax respectively by the procedure of Example 1. For each wax, there were prepared three blends containing respectively, 0.01, 0.05 and 0.1 per cent by weight of ethylene polymer. The tensile strength of the blends and of the uncompounded waxes is shown in Table II.

TABLE II

*132° F. M. P. paraffin wax*

| Concentration of Polymerized Ethylene, Percent | 0 | 0.01 | 0.05 | 0.1 |
|---|---|---|---|---|
| Average Tensile Strength, Lbs./¼ sq. in. | 93 | 101 | 112 | 117 |

*122° F. M. P. paraffin wax*

| Concentration of Polymerized Ethylene, Percent | 0 | 0.01 | 0.05 | 0.1 |
|---|---|---|---|---|
| Average Tensile Strength, Lbs./¼ sq. in. | 47 | 49 | 54 | 63 |

*Example 4.*—A blend of a microcrystalline or amorphous petroleum wax (Gulf Petrowax A) containing 1 per cent by weight of polymerized ethylene was prepared by the procedure of Example 1. When the tensile strengths of the blend and uncompounded petroleum wax were determined by the Perkins test, it was found that the blend had a tensile strength of 52 pounds, whereas the uncompounded wax had a tensile strength of 45 pounds.

In addition to having improved tensile strength properties, paraffin waxes containing the herein named small amounts of high molecular weight ethylene polymers possess improved sealing characteristics. The ethylene polymer in such blends does not segregate on rapid cooling and does not produce any mottled effects in the cold wax.

The percentages referred to herein and in the appended claims are weight percentages.

The wax compositions described herein can contain in addition to the high molecular weight ethylene polymers opacifiers, anti-oxidants or other modifying agent. Polymerized isobutylene can be added to the wax-polymerized ethylene composition.

We claim:

1. The method of preparing a high tensile strength petroleum wax composition containing an ethylene polymer having an average molecular weight of from about 5000 to about 25,000 comprising milling an ethylene polymer having an average molecular weight of about 5000 to about 25,000 with from about 5% to about 60% by weight of a petroleum wax at a temperature of from about 220° F. to about 360° F. to obtain a homogeneous blend of said petroleum wax and said polymer and then dissolving a sufficient amount of said blend in a petroleum wax at a temperature of from about 140° F. to about 250° F., to obtain a final wax composition containing from about 0.001% to about 0.2% by weight of said polymer.

2. The method of claim 1 wherein the petroleum wax is a paraffin wax.

3. The method of preparing a wax composition containing an ethylene polymer having an average molecular weight of from about 5000 to about 25,000; comprising milling an ethylene polymer having an average molecular weight of from about 5000 to about 25,000 with from about 5% to about 60% by weight of a petroleum wax at a temperature of from about 220° F. to about 360° F. to obtain a homogeneous blend of said petroleum wax and said polymer, and then dissolving said blend in petroleum wax at a temperature of from about 140° F. to about 250° F. to obtain a complete solution of the ethylene polymer in the petroleum wax.

4. The method of preparing a wax composition containing an ethylene polymer having an average molecular weight of from about 5000 to about 25,000; comprising forming a homogeneous blend of an ethylene polymer having an average molecular weight of from about 5000 to about 25,000 with from about 5% to about 60% by weight of a petroleum wax at a temperature of from about 220° F. to about 360° F. and then dissolving said blend in petroleum wax at a temperature of from about 140° F. to about 250° F. to obtain a complete solution of the ethylene polymer in the petroleum wax.

5. A method for preparing an improved paraffin wax comprising melting together solid polymerized ethylene and paraffin wax in approximately equal quantities, mixing until homogeneous, and subsequently adding thereto a quantity of molten paraffin wax such that the amount of polymerized ethylene in the combined wax and polymerized ethylene composition is from 0.001 to 7 per cent.

6. The method of preparing a wax composition containing an ethylene polymer having an average molecular weight of from about 10,000 to about 80,000 which comprises forming a homogeneous blend of an ethylene polymer having an average moleculer weight of from about 10,000 to about 80,000 with an approximately equal amount of a paraffin wax having a melting point between about 130° F. and 140° F. at a temperature above the melting point of said wax and then incorporating with said blend at a temperature above the melting point of said wax, an additional amount of said paraffin wax to obtain a homogeneous wax composition.

7. The method of preparing a petroleum wax composition containing a solid ethylene polymer which comprises forming a homogeneous blend of a solid ethylene polymer with from about 5 to about 60 per cent by weight of a petroleum wax at a temperature above the melting point of the wax and then incorporating with said blend at a temperature above the melting point of said wax an additional amount of said wax to obtain a homogeneous wax composition.

8. The method of claim 7, wherein the petroleum wax is an amorphous petroleum wax.

9. The method of claim 7, wherein the petroleum wax is a paraffin wax.

JOHN R. BOWMAN.
WILLIAM P. RIDENOUR.
JUNE HOLLENBACK WHITTAKER.

References Cited in the file of this patent

UNITED STATES PATENTS

| Number | Name | Date |
|---|---|---|
| 2,504,270 | MacLaren | Apr. 18, 1950 |

OTHER REFERENCES

"Alkathene," Brand of Polythene, Plastics Technical Bulletin No. 5, Imperial Chemical Industries Ltd., Nov. 1943, pages 4, 12.